United States Patent [19]

Mitate et al.

[11] Patent Number: 5,792,574
[45] Date of Patent: Aug. 11, 1998

[54] NONAQUEOUS SECONDARY BATTERY

[75] Inventors: Takehito Mitate, Yamatotakada; Motoaki Nishijima, Gose; Yoshihiro Tsukuda, Osaka; Kazuo Yamada, Kitakatsuragi-gun, all of Japan

[73] Assignee: Sharp Kabushiki Kaisha, Osaka, Japan

[21] Appl. No.: 810,346

[22] Filed: Mar. 3, 1997

[30] Foreign Application Priority Data

| Mar. 4, 1996 | [JP] | Japan | 8-045913 |
| Mar. 4, 1996 | [JP] | Japan | 8-045914 |
| Feb. 18, 1997 | [JP] | Japan | 9-033464 |
| Feb. 18, 1997 | [JP] | Japan | 9-033465 |

[51] Int. Cl.[6] .................. H01M 4/02; H01M 10/40
[52] U.S. Cl. ................. 429/194; 429/218; 429/223
[58] Field of Search ................. 429/218, 223, 429/194; 423/594; 252/182.1

[56] References Cited

U.S. PATENT DOCUMENTS

| 5,427,875 | 6/1995 | Yamamoto et al. | 429/223 |
| 5,429,890 | 7/1995 | Pynenburg et al. | 429/223 X |
| 5,486,346 | 1/1996 | Fey | 423/594 |
| 5,490,320 | 2/1996 | Hasugawa et al. | 429/223 X |

FOREIGN PATENT DOCUMENTS

| 5-290845 | 11/1993 | Japan. |
| 6-60887 | 3/1994 | Japan. |
| 6-111822 | 4/1994 | Japan. |
| 6-96769 | 4/1994 | Japan. |
| 6-267539 | 9/1994 | Japan. |

*Primary Examiner*—Anthony Skapars
*Attorney, Agent, or Firm*—Nixon & Vanderhye P.C.

[57] ABSTRACT

A nonaqueous secondary battery is provided, which comprises a positive electrode, a negative electrode and a nonaqueous ion conductor, the negative electrode containing a lithium-containing substance or a lithium insertable and releasable substance as a positive electrode active material, the positive electrode containing a lithium nickelate compound as a positive electrode substance, wherein the lithium nickelate compound has a layered rocksalt crystalline structure belonging to Space Group R-3m and the ratio of a 3a- and 3b-site occupation rate of lithium atoms to a 3a- and 3b-site occupation rate of nickel atoms in the crystal lattice thereof is 0.85 to 1.15.

18 Claims, 6 Drawing Sheets

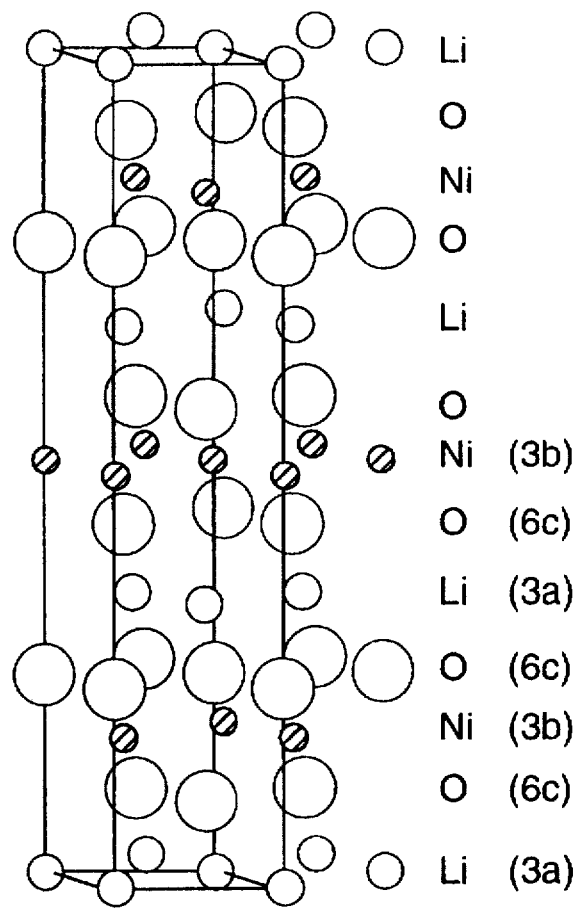
FIG. 1
FIG. 2
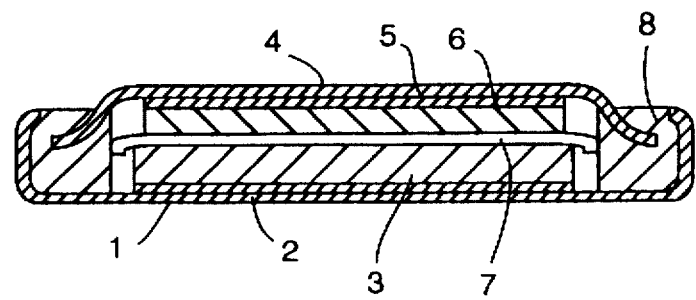

NONAQUEOUS SECONDARY BATTERY

BACKGROUND OF THE INVENTION

1. Field of the Invention

The present invention relates to a nonaqueous secondary battery comprising a positive electrode, a negative electrode and a nonaqueous ion conductor, the positive electrode containing a lithium nickelate compound, the negative electrode containing a lithium insertable and releasable substance such as carbon or graphite.

2. Related Art

With the size reduction and power saving of electronic devices, research and development have been made on light-weight secondary batteries which utilize an alkali metal such as lithium and are capable of high voltage charging and discharging. Where an alkali metal such as lithium is used alone for the negative electrode of a secondary battery, a dendrite (branching tree-like crystal) appears and grows on a metal surface during repeated charge and discharge cycles, i.e., during a metal dissolution and deposition process. The dendrite may penetrate through the separator of the secondary battery to come in contact with the positive electrode. This will result in a short circuit within the secondary battery. Where an alkali metal alloy is used for the negative electrode of a secondary battery instead of the alkali metal, the generation of the dendrite can be suppressed and, hence, the charge and discharge cycle characteristics are improved in comparison with the case where the alkali metal is used alone. However, the generation of the dendrite cannot be completely prevented, and there still exists the problem of the short circuit within the secondary battery. In recent years, carbon materials and organic materials such as conductive polymers useful for the negative electrode have been developed which utilize a process of absorption and desorption of alkali metal ions instead of the dissolution-deposition process or the dissolution-deposition-diffusion in solid process of a metal such as an alkali metal or its alloy. The use of these materials, in principle, prevents the generation of the dendrite which may occur where the alkali metal or its alloy is used. This remarkably reduces the risk of the short circuit within the battery. For this reason, a lithium ion battery utilizing a carbon or graphite material for its negative electrode and lithium cobaltate for its positive electrode has been put in practical use.

The use of lithium cobaltate for the positive electrode, however, entails an increase in the material cost because of the scarcity of the cobalt resource.

The use of lithium nickelate prepared from a nickel material which is a less expensive and more abundant resource was proposed by John Banister Goodenough et.al. (Japanese Examined Patent Publication No. 63-59507 (1988)). Lithium nickelate has since then been receiving attention.

High voltage secondary batteries have been proposed which have an electrode containing a composite oxide of lithium nickelate and an additional element. More specifically, $A_xM_yN_zO_2$ wherein A is an alkali metal, M is a transition metal, N is aluminum, indium or tin, some of transition metal atoms are replaced with aluminum, indium or tin atoms, x is 0.05 to 1.10, y is 0.85 to 1.00, and z is 0.001 to 0.10 is disclosed in Japanese Unexamined Patent Publication No. 62-90863 (1987); $LiNi_xCo_{1-x}O_2$ in Japanese Unexamined Patent Publication No. 62-264560 (1987); a lithium nickelate compound wherein some of lithium atoms are replaced with alkali earth metal atoms in Japanese Unexamined Patent Publication No. 4-171659 (1992); a lithium nickelate compound wherein some of nickel atoms are replaced with magnesium, vanadium, chromium or copper atoms in Japanese Unexamined Patent Publication No. 5-101827 (1993); a lithium nickelate compound wherein some of nickel atoms are replaced with titanium, vanadium, manganese or iron atoms in Japanese Unexamined Patent Publication No. 5-283076 (1993); and a lithium nickelate compound wherein some of nickel atoms are replaced with copper, silver or zinc atoms in Japanese Unexamined Patent Publication No. 6-124707 (1994).

Further, lithium nickelate compounds $Li_yNi_{2-y}O_2$ (y: 0.84 to 1.22) and $Li_xNiO_y$ (x: 1.15 to 1.75, y>0) are proposed in Japanese Unexamined Patent Publications No. 2-40861 (1990) and No. 5-290851 (1993), respectively, for improvement of the discharge capacity.

For improvement of the discharge capacity, the discharge efficiency and the cycle characteristics, Japanese Unexamined Patent Publications No. 5-290845 (1993), No. 6-60887 (1994), No. 6-96769 (1994) and No. 6-111822 (1994) propose lithium nickelate compounds each having an optimized peak intensity ratio in the X-ray powder diffraction pattern thereof, and Japanese Unexamined Patent Publications No. 5-283076 (1993) and No. 6-124707 (1994) propose lithium nickelate compounds in which some of nickel atoms are replaced with atoms of another element so that a-axis and b-axis lattice constants in the hexagonal crystal system thereof are optimized. Further, Japanese Unexamined Patent Publications No. 6-267539 (1994) proposes a lithium nickelate compound having an optimized peak half width od (003) plane and an optimized nickel valence.

However, where electrodes containing the lithium nickelate compounds of the prior art as positive electrode active materials thereof are each evaluated with a terminal voltage of 4.2 V to 4.3 V relative to a lithium reference electrode, the electrodes exhibit a low discharge capacity (140 mAh/g in the first cycle) with a wide variation and a poor reproducibility. Where the electrodes are each charged up to a higher potential (e.g., 4.5 V), the electrodes exhibit a discharge capacity of about 180 mAh/g in the first cycle, but the discharge capacity remarkably decreases during repeated charge and discharge cycles so that the lifetimes of the batteries are shortened. Further, where the batteries are charged and discharged at a high temperature, the lifetimes thereof are further shortened.

SUMMARY OF THE INVENTION

As a result of an intensive study to overcome the foregoing problems, the inventors of the present invention have found that the site occupation rates of lithium atoms and nickel atoms in a lithium nickelate compound (determined on the basis of the X-ray powder diffraction pattern thereof) are correlative with the discharge capacity and the charge and discharge cycle characteristics of a positive electrode containing the lithium nickelate compound.

In accordance with the present invention, there is provided a nonaqueous secondary battery comprising a positive electrode, a negative electrode and a nonaqueous ion conductor, the negative electrode containing a lithium-containing substance or a lithium insertable and releasable substance as a positive electrode active material, the positive electrode containing a lithium nickelate compound as a positive electrode active material, wherein the lithium nickelate compound has a layered rocksalt crystalline structure belonging to Space Group R-3m and the ratio of a 3a- and 3b-site occupation rate of lithium atoms to a 3a- and 3b-site occupation rate of nickel atoms in the crystal lattice thereof is 0.85 to 1.15.

BRIEF DESCRIPTION OF THE DRAWINGS

FIG. 1 is a diagram illustrating the basic structure of a lithium nickelate compound belonging to the Space Group R-3m in the hexagonal crystal system;

FIG. 2 is a sectional view illustrating the construction of coin-type batteries fabricated in Examples 17, 19 to 27 and 29;

DESCRIPTION OF THE PREFERRED EMBODIMENTS

Figure 3:
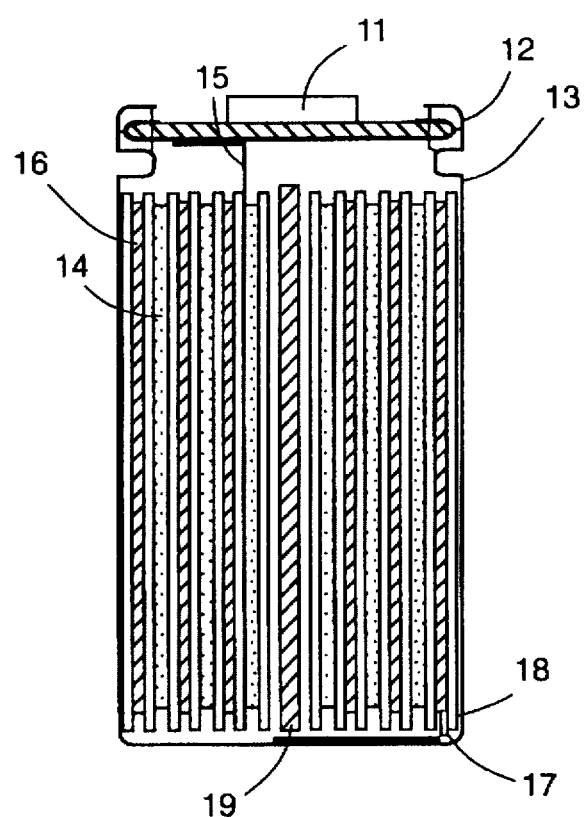
FIG. 3 is a sectional view illustrating the construction of cylindrical batteries fabricated in Examples 18 and 30 and Comparative Example 14.

A lithium nickelate compound according to the present invention has a basic composition formula of $LiNiO_2$. Where the lithium nickelate compound is used as a positive electrode active material for a nonaqueous secondary battery, particularly for a lithium secondary battery, the lithium composition ratio varies within a range between 1 and 0 because lithium atoms are inserted therein and released therefrom during the charge and discharge process.

The lithium nickelate compound has a layered rocksalt crystalline structure belonging to the Space Group R-3m in the hexagonal crystal system. The basic structure of the lithium nickelate compound is shown in FIG. 1. Lithium atoms and nickel atoms are located at hexagonal coordination positions in the cubic closest packing of oxygen atoms. Oxygen atoms in an $NiO_6$ octahedral unit are shared with three adjacent $NiO_6$ octahedral units, so that $NiO_2$ layered structure is formed. Lithium atoms are located at hexagonal coordination positions between $NiO_2$ layers to form $LiNiO_2$. Oxygen atoms are located at 6c sites. Lithium atoms are located at 3a sites, and nickel atoms are located at 3b sites.

In the present invention, the Rietveld analysis is performed on an X-ray diffraction pattern of the lithium nickelate compound obtained by the X-ray powder diffractometry to precisely determine lattice constants, site occupation rates and other structural parameters.

The Rietveld analysis extracts data from an X-ray or neutron powder diffraction pattern. An actually obtained diffraction pattern is fitted to a diffraction pattern of an assumptive crystalline structure model for refinement of parameters concerning the crystalline structure.

More specifically, integrated intensities at respective diffractionpoints in thediffractionpattern of the assumptive structure model are multiplied by a function for approximation of peak forms, and the products are summed. Then, the parameters concerning the crystalline structure are precisely determined by the nonlinear least square method so that the intensities at the respective diffraction points in the diffraction pattern of the assumptive model become as close as possible to those in the actually obtained diffraction pattern.

The lithium nickelate compound of the present invention is such that the ratio $(a_L/a_{Ni})$ of a 3a- and 3b-site occupation rate $(g_1+g_2=a_{Li})$ of lithium atoms to a 3a- and 3b-site occupation rate $(g_3+g_4=a_{Ni})$ of nickel atoms in the crystal lattice thereof is 0.85 to 1.15. If the ratio $(a_L/a_{Ni})$ is lower than 0.85, agreaterportion of the lithium nickelate compound has a crystalline structure exhibiting poor charge and discharge characteristics. If the ratio $(a_L/a_{Ni})$ is higher than 1.15, the synthesis of the lithium nickelate compound is difficult.

Where the lithium nickelate compound has a ratio $(a_L/a_{Ni})$ of 0.85 to 1.04 (preferably 0.9 to 1.04, more preferably 1 to 1.04), the lithium nickelate compound preferably satisfies at least one of the following property requirements:

(a) The 3a-site occupation rate $(g_3)$ of nickel atoms is 0 to 0.08 (more preferably 0.01 to 0.08);

(b) The 3b-site occupation rate $(g_2)$ of lithium atoms is 0 to 0.07;

(c) The sum $(g_1+g_2=a_{Li})$ of the 3a-site occupation rate $(g_1)$ and the 3b-site occupation rate $(g_2)$ of lithium atoms is 0.92 to 1.02;

(d) The sum $(g_3+g_4=a_{Ni})$ of the 3a-site occupation rate $(g_3)$ and the 3b-site occupation rate $(g_4)$ of nickel atoms is 0.98 to 1.08; and (e) The a-axis and c-axis lattice constants in the hexagonal crystal system are 0.2870 nm to 0.2880 nm and 1.4175 nm to 1.4210 nm, respectively.

Where the lithium nickelate compound satisfies at least one of the aforesaid property requirements (a) to (d), nickel atoms and/or lithium atoms are prevented from migrating to other sites (to 3a-sites and 3b-sites, respectively), so that the lithium nickelate compound is prevented from having a crystalline structure exhibiting poor charge and discharge characteristics.

If the a-axis lattice constant is less than 0.2870 nm or if the c-axis lattice constant is less than 1.4175 nm, impurities may be included in the crystal lattice. If the a-axis lattice constant is greater than 0.2880 nm or if the c-axis lattice constant is greater than 1.4210 nm, the electrode characteristics, particularly, the charge and discharge capacity characteristics and the cycle characteristics may be deteriorated.

Where the lithium nickelate compound has a ratio $(a_L/a_{Ni})$ of 1.05 to 1.15, the discharge capacity of the resulting electrode can be prevented from remarkably decreasing during repeated charge and discharge cycles even if the electrode is charged up to a higher potential. Thus, a nonaqueous secondary battery can be provided which is highly resistant to over-charge. The term "over-charge" herein means that, where the normal charge voltage is 4.2 V to 4.3 V, for example, the battery is charged up to a charge voltage of 4.5 V to 5.0 V. Where the ratio $(a_L/a_{Ni})$ is in the aforesaid range, the lithium nickelate compound preferably satisfies at least one of the following property requirements:

(a) The 3a-site occupation rate $(g_3)$ of nickel atoms is 0 to 0.07 (more preferably 0.02 to 0.06);

(b) The 3b-site occupation rate $(g_2)$ of lithium atoms is 0.03 to 0.10 (more preferably 0.05 to 0.09);

(c) The sum $(g_1+g_2=a_{Li})$ of the 3a-site occupation rate $(g_1)$ and the 3b-siteoccupation rate $(g_2)$ of lithium atoms is 1.02 to 1.07; and (d) The sum $(g_3+g_4=a_{Ni})$ of the 3a-site occupation rate $(g_3)$ and the 3b-site occupation rate $(g_4)$ of nickel atoms is 0.93 to 0.98.

The lithium nickelate compound preferably has a specific surface area of 0.2 m²/g to 10 m²/g, more preferably 0.2 m²/g to 6 m²/g, further more preferably 0.2 m²/g to 5 m²/g, which is determined by the BET method. If the specific surface area is smaller than 0.2 m²/g, the discharge capacity of the resulting electrode is reduced. If the specific surface area is greater than 10 m²/g, the cycle characteristics of the resulting electrode are deteriorated. Particularly, a specific surface area of not greater than 6 m²/g can suppress spontaneous discharge of the battery (a good storage characteristic).

The lithium nickelate compound has a stable crystalline structure because excess lithium atoms occupy some of the nickel sites. Therefore, the electrode containing the lithium nickelate compound has a stable discharge capacity, and exhibits superior cycle characteristics even if the electrode is charged to a higher potential.

The lithium nickelate compound is prepared in the following manner. A lithium material and a nickel material are mixed in an Li/Ni ratio greater than a stoichiometric Li/Ni ratio. Then, the mixture is calcined at a temperature of 600° C. to 900° C. in an oxygen atmosphere or in air. After the mixing of the lithium compound and the nickel compound, the mixture may be press-moldedandcalcined. Examples of specificlithium materials include lithium carbonate, lithium hydroxide, lithium peroxide, lithium oxide, lithium nitrate, lithium sulfate, lithium acetate, lithium benzoate, lithium chloride, lithium bromide, lithium citrate, lithium formate, lithium iodide, lithium lactate, lithium oxalate, lithium pyruvate, lithium stearate and lithiumtartrate. Examplesofspecificnickelmaterials include nickel carbonate, nickel hydroxide, nickel oxide, nickel oxyhydroxide, nickel nitrate, nickel sulfate, nickel acetate, nickel benzoate, nickel chloride, nickel bromide, nickel citrate, nickel formate, nickel iodide, nickel oxalate, nickel stearate and nickel tartrate.

For preparation of a positive electrode, amixture containing the lithium nickelate compound as a positive electrode active material prepared in the aforesaid manner, a conductive material, a binder and, as required, a solid electrolyte and the like is used. Examples of specific conductive materials include carbon materials such as carbon black, acetylene black, Ketchen black, powdery graphite materials (e.g., natural graphite and synthetic graphite), powdery metals, and fibrous metals, but not limited thereto. Examples of specific binders include fluoropolymers such as polytetrafluoroethylene, polyvinylidene fluoride, polyolefine polymers such as polyethylene, polypropylene and ethylene-propylenediene terpolymer, and styrene-butadiene rubber, but not limited thereto. The mixing ratio is preferably 1 part to 50 parts by weight of the conductive material, 1 part to 30 parts by weight of the binder with respect to 100 parts by weight of the positive electrode active material. If the proportion of the conductive material is less than 1 part by weight, the electrical resistance or polarization of the resulting electrode is increased to reduce the discharge capacity of the electrode, so that a practical secondary battery cannot be fabricated. If the proportion of the conductive material is greater than 50 parts by weight (which may vary depending on the kind of the conductive material to be blended), the absolute amount of the active material contained in the resulting electrode is reduced, so that the discharge capacity of the electrode is reduced. If the proportion of the binder is less than 1 part by weight, the binding ability is lost. If the proportion of the binder is greater than 30 parts by weight, the discharge capacity of the resulting electrode is reduced to an impractical level, because the absolute amount of the active material contained in the electrode is reduced like the case of the conductive material and the electrical resistance or polarization of the electrode is increased as described above.

For preparation of the positive electrode, the mixture containing the aforesaid positive electrode materials is compressed into a pellet form. Alternatively, an appropriate solvent is added to the mixture to affordapaste, which is appliedona collector, dried and compressed into a sheet form. The positive electrode preparation method is not limited to these methods.

A collector can be used for collecting electrons which are transferred from or to the positive electrode therethrough. The collector is formed of a metal, an alloy, a carbon material or the like. Examples of specific materials for the collector include titanium, aluminum and stainless steel, and copper materials, aluminum materials and stainless steel materials which are surface-treated with carbon, titanium or silver, or subjected to surface oxidation. Usable as the collector are a foil, a film, a sheet, a mesh and a punched sheet of any of these materials in a lath form, a porous form, a foamed form or a fibrous form. The thickness of the collector is not particularly limited, but is typically 1 μm to 1 mm.

Usable as the negative electrode are metal lithium, lithium alloys and lithium absorbable and desorbable substances. Examples of specific lithiumalloys include a lithium aluminum alloy, a lithium tin alloy, a lithium lead alloy and a Wood's alloy. Examples of specific substances which can electrochemically be doped or dedoped with lithium ions include conductive polymers such as polyacetylene, polythiophene and polyparaphenylene, pyrolytic carbon materials, carbon materials pyrolyzed in a gas phase in the presence of a catalyst, carbon materials obtained by calcining pitch coke, tar and the like, and carbon materials obtained by calcining polymers such as cellulose and a phenolic resin. Other exemplary negative electrode active materials include graphite materials (natural graphite, synthetic graphite, exfoliated graphite and the like) which can be intercalated and deintercalated with lithium ions, and inorganic compounds ($Wo_2$, $MoO_2$ and the like) which can be doped or dedoped with lithium ions. These materials may be used either alone or as a composite thereof. Among those negative electrode active materials, pyrolytic carbon materials, carbon materials pyrolyzed in a gas phase in the presence of a catalyst, carbon materials obtained by calcining pitch, coke, tar and the like, carbon materials obtained by calcining polymers, and graphite materials (natural graphite, synthetic graphite, exfoliated graphite and the like) are preferable for fabrication of a highly safe secondary battery having superior battery characteristics. The graphite materials are particularly preferable for fabrication of a secondary battery adapted for high voltage discharge.

Where the negative electrode is formed by employing any of the aforesaid conductive polymeric materials, carbon materials, graphite materials and inorganic compounds as the negative electrode active material, a conductive material and a binder may be blended therewith. Examples of specific conductive materials include carbon materials such as carbon black, acetylene black and Ketchen black, powdery graphite materials (e.g., natural graphite and synthetic graphite), powdery metals and fibrous metals, but not limited thereto. Examples of specific binders include fluoropolymers such as polytetrafluoroethylene and polyvinylidene fluoride, polyolefine polymers such as polyethylene, polypropylene and ethylene-propylenediene terpolymer, and styrene-butadiene rubber, but not limited thereto.

Exemplary ion conductors to be used for the nonaqueous secondary battery include an organic electrolytic solution, a solid electrolyte (e.g., a polymeric solid electrolyte or an inorganic solid electrolyte) and a molten salt, among which the organic electrolytic solution is preferred. The organic electrolytic solution contains an organic solvent and an electrolyte. Examples of specific organic solvents include aprotic organic solvents including esters such as propylene carbonate, ethylene carbonate, butylene carbonate, diethyl carbonate, dimethyl carbonate, ethylmethyl carbonate, γ-butyrolactone, methyl formate and methyl acetate, tetrahydrofuran, substituted tetrahydrofuran such as 2-methyltetrahydrofuran, ethers such as dioxolane, diethyl ether, dimethoxyethane, diethoxyethane and methoxyethoxyethane, dimethylsulfoxide, sulfolane, methylsulfolane and acetonitrile. These organic solvents may be used either alone or in combination. Examples of specific electrolytes include lithium salts such as lithium perchlorate, lithium borofluoride, lithium phosphorus hexafluoride, lithium hexafluoroarsenate, lithium trifluoromethane sulfonate, lithium halides and lithium chloroaluminate. These electrolytes may be used either alone or in combination. The electrolytic solution is prepared by dissolving the electrolyte in the organic solvent. The organic solvent and the electrolyte to be used for the preparation of the electrolytic solution are not limited to those described above.

Known as the inorganic solid electrolyte are a nitride, halides and oxacid salts of lithium and phosphorus sulfide compounds. Examples thereof include $Li_3N$, $LiI$, $Li_3N$—$LiI$—$LiOH$, $LiSiO_4$, $LiSiO_4$—$LiI$—$LiOH$, $Li_3PO_4$—$Li_4SiO_4$ and $Li_2SiS_3$.

Usable as the organic solid electrolyte are a substance comprised of any of the aforesaid electrolytes and a polymer permitting the dissociation of the electrolyte, and a substance comprised of a polymer having an ionization group. Examples of the polymer permitting the dissociation of the electrolyte include polyethylene oxide derivatives, polymers containing polyethylene oxide derivatives, polypropylene oxide derivatives, polymers containing polypropylene oxide derivatives, and phosphate polymers. A polymer matrix material containing any of the aforesaid aprotic polar solvents, a mixture of a polymer having an ionization group and the aprotic polar electrolytic solution, or polyacrylonitrile may be added to the electrolytic solution. The inorganic and organic solid electrolytes may be used in combination.

A separator is used to retain the electrolytic solution. Exemplary materials for the separators include nonwoven fabrics, woven fabrics and microporous materials of electrically insulative synthetic resin fibers, glass fibers and natural fibers, and compacts of alumina power and the like. Among those, microporous materials and nonwoven fabrics of polyethylene, polypropylene and like synthetic resins are particularly preferred in terms of the quality stability. A separator made of a microporous material or a nonwoven fabric of any of such synthetic resin fibers may be adapted to isolate the positive electrode and the negative electrode from each other when the battery is abnormally heated to cause the separator to be fused. From the viewpoint of safety, the separator of this type is preferably used. The thickness of the separator is not particularly limited as long as the separator can retain a required amount of the electrolytic solution and prevent the short circuit between the positive electrode and the negative electrode, but may be typically about 0.01 mm to about 1 mm, preferably about 0.02 mm to about 0.05 mm.

The present invention can be applied to secondary batteries of coin type, button type, sheet type, cylinder type, square type and the like.

A coin- or button-type battery (FIG. 2) is typically fabricated in the following manner. A positive electrode and a negative electrode each formed in a pellet form are put in a battery case, and a cover is press-fitted to the battery case with an insulation packing interposed therebetween.

A cylinder- or square-type battery (FIG. 3) is typically fabricated in the following manner. A positive electrode and a negative electrode each formed in a sheet form are put in a battery case. The electrodes are electrically connected to the case and to a sealing plate, respectively. Then, the electrolytic solution is poured in the case, and the case is sealed with the sealing plate with an insulative packing interposed therebetween or with the sealing plate insulated from the case by a hermetic sealing. A safety valve including a safety device may be used for the sealing plate. Exemplary safety devices include a fuse, a bimetal and a PTC device which function as an overcurrent preventive device. For prevention of an increase in the inner pressure of the battery case, the hermetic sealing (gasket), the sealing plate or the battery case may be formed with a slit. Further, an external circuit for preventing over-charge or over-discharge of the battery may be used.

The pellet or sheet electrodes are preferably dried and dehydrated in advance in a common manner. For example, hot air, vacuum, infrared radiation, far-infrared radiation, microwave and dry air may be used alone or in combination for the drying and dehydration of the electrodes. The temperature for the drying and dehydration is preferably within a range between 50° C. and 380° C.

EXAMPLES

The present invention will hereinafter be described in detail by way of examples thereof. It is noted that the Rietveld analysis is performed in a known manner, for example, in accordance with a method described in "The Rietvelt Methode" (R. A. Young, Oxford University Press, Oxford (1993)).

For the Rietveld analysis, a diffraction pattern computed on the basis of an assumptive structural model is fitted to an actually obtained diffraction pattern.

Therefore, the structural model should first be prepared. Exemplary parameters for the structural model include: (1) parameters for adjusting an intensity of a diffraction peak (scale factor and orientation selectivity parameter); (2) parameters concerning a diffraction peak position (lattice constant and zero point shift); (3) a parameter concerning a profile (peak half width parameter); (4) parameters concerning the crystalline structure (coordinates of atoms, occupation rates and isotropic thermal motion parameter); and (5) background parameters. The initial values of the parameters (1), (2), (3) and (5) can be determined on the basis of data in the actually obtained X-ray diffraction pattern. In the case of an $LiNiO_2$ sample, the initial values of the parameters (4) concerning the crystalline structure are such that the space group of the crystalline phase is R-3m, and Li atoms, Ni atoms and O atoms are located at 3a sites, 3b sites and 6c sites, respectively.

Thus, the initial values of the respective parameters are determined for the Rietveld analysis. On the basis of the result of the analysis, the parameters are sequentially determined in such a manner that the R factor is constantly reduced for refinement.

In the case of the analysis of the LiNiO$_2$ sample, it is considered that lithium atoms and nickel atoms are readily replaced with each other at the 3a sites and 3b sites. Therefore, the initial values of the parameters for the site occupation rates are determined such that most of the 3a sites are occupied by Li atoms and the rest of the 3a sites are occupied by Ni atoms (i.e., the 3a-site occupation rate of Li atoms is high), and most of the 3b sites are occupied by Ni atoms and the rest of the 3b sites are occupied by Li atoms (i.e., the 3b-site occupation rate of Ni atoms is high). When the parameters each reach an physically optimal value (i.e., the R factor is sufficiently small and a difference ($R_{wp}$ value) between the measurement and the computed value is not greater than about 10%), the analysis ends. Thus, the lattice constants and the occupation rates of Li atoms and Ni atoms at the respective sites are determined. At this time, the statistically optimal $R_{wp}$ value ($R_e$) is also determined.

It is noted that electrodes and batteries were evaluated at 20° C. in the following examples and comparative examples unless the evaluation temperature is otherwise specified.

Example 1
Synthesis of Lithium Nickelate

Lithium hydroxide and nickel oxyhydroxide (NiOOH) were weighed in a ratio of Li:Ni=1.1:1, and mixed in a mortar. In turn, the mixture was formed into a pellet by applying thereto a pressure of 100 kg/cm$^2$. The pellet was calcined at 750° C. in an oxygen atmosphere for 10 hours. Thus, an active material of a lithium nickelate compound was prepared. The active material was analyzed by the X-ray powder diffractometry using CuK α beam as an X-ray source, and then the Rietveld analysis was carried out in the aforesaid manner. The results are shown in Table 1. Table 1 also shows: the parameters I(003)/I(104) and I(104)/I(003) (ratios between an intensity of a peak indicative of the (003) plane diffraction and an intensity of a peak indicative of the (104) plane diffraction) and the half width of a peak indicative of the (003) plane diffraction, which were determined by the X-ray powder diffractometry; the Li/Ni ratio determined by the ICP emission spectroscopy; and the specific surface area determined by the nitrogen adsorption BET method.

TABLE 1

(a)

| | a-axis length (nm) | c-axis length (nm) | 3a-site occupation rate of Li | 3b-site occupation rate of Li | 3a-site occupation rate of Ni | 3b-site occupation rate of Ni | 6c-site occupation rate of O | Position of O [Z-parameter] | $R_{wp}$ (%) | $R_e$ (%) |
|---|---|---|---|---|---|---|---|---|---|---|
| EX. 1 | 0.28784 | 1.41919 | 0.934 | 0.058 | 0.066 | 0.943 | 1 | 0.2440 | 12.0 | 6.4 |
| EX. 2 | 0.28791 | 1.42007 | 0.960 | 0.059 | 0.040 | 0.941 | 1 | 0.2430 | 10.6 | 5.5 |
| EX. 3 | 0.28736 | 1.41912 | 0.949 | 0.000 | 0.051 | 1.000 | 1 | 0.2433 | 14.2 | 8.3 |
| EX. 4 | 0.28709 | 1.41762 | 0.995 | 0.000 | 0.005 | 1.000 | 1 | 0.2418 | 12.8 | 7.2 |
| EX. 5 | 0.28795 | 1.42089 | 0.942 | 0.029 | 0.058 | 0.971 | 1 | 0.2418 | 10.8 | 6.3 |
| EX. 6 | 0.28802 | 1.42012 | 0.923 | 0.000 | 0.077 | 1.000 | 1 | 0.2418 | 12.1 | 6.3 |
| EX. 7 | 0.28796 | 1.42080 | 0.959 | 0.061 | 0.041 | 0.939 | 1 | 0.2419 | 10.5 | 5.6 |
| EX. 8 | 0.28786 | 1.41936 | 0.928 | 0.068 | 0.072 | 0.932 | 1 | 0.2438 | 12.6 | 6.4 |
| EX. 9 | 0.28773 | 1.41908 | 0.955 | 0.000 | 0.045 | 1.000 | 1 | 0.2426 | 14.4 | 5.6 |
| COM. EX. 1 | 0.28807 | 1.42045 | 0.952 | 0.060 | 0.048 | 0.940 | 1 | 0.2430 | 10.5 | 5.5 |
| COM. EX. 2 | 0.28797 | 1.42116 | 0.972 | 0.057 | 0.028 | 0.943 | 1 | 0.2419 | 10.8 | 5.6 |
| COM. EX. 3 | 0.28785 | 1.42065 | 0.976 | 0.071 | 0.023 | 0.929 | 1 | 0.2419 | 10.3 | 5.5 |
| COM. EX. 4 | 0.28692 | 1.41744 | 0.991 | 0.000 | 0.009 | 1.000 | 1 | 0.2413 | 13.1 | 7.1 |
| COM. EX. 5 | 0.28781 | 1.41849 | 0.931 | 0.061 | 0.069 | 0.919 | 1 | 0.2443 | 12.9 | 6.4 |
| COM. EX. 6 | 0.28819 | 1.42011 | 0.914 | 0.000 | 0.086 | 1.000 | 1 | 0.2417 | 11.9 | 6.3 |
| COM. EX. 7 | 0.28798 | 1.42051 | 0.921 | 0.000 | 0.079 | 1.000 | 1 | 0.2416 | 11.7 | 5.7 |

(b)

| | 3a- and 3b-site occupation rate of Li($a_{Li}$) | 3a- and 3b-site occupation rate of Ni($a_{Ni}$) | $a_{Li}/a_{Ni}$ | I(003)/I(104) | I(104)/I(003) | Half width of peak of (003) plane | Li/Ni (Chemical analysis) | BET specific surface area (m$^2$/g) |
|---|---|---|---|---|---|---|---|---|
| EX. 1 | 0.992 | 1.009 | 0.983 | 1.006 | 0.994 | 0.14 | 1.03 | 1.4 |
| EX. 2 | 1.019 | 0.981 | 1.038 | 1.121 | 0.892 | 0.12 | 1.04 | 0.4 |
| EX. 3 | 0.949 | 1.051 | 0.903 | 1.135 | 0.881 | 0.16 | 1.01 | 1.1 |
| EX. 4 | 0.995 | 1.005 | 0.990 | 1.350 | 0.741 | 0.13 | 1.08 | 0.21 |
| EX. 5 | 0.971 | 1.029 | 0.944 | 1.129 | 0.886 | 0.13 | 0.96 | 5.6 |
| EX. 6 | 0.923 | 1.077 | 0.857 | 1.093 | 0.915 | 0.12 | 0.95 | 8.42 |
| EX. 7 | 1.020 | 0.980 | 1.041 | 1.152 | 0.868 | 0.18 | 1.09 | 9.11 |
| EX. 8 | 0.996 | 1.004 | 0.992 | 0.983 | 1.017 | 0.15 | 1.02 | 2.6 |
| EX. 9 | 0.955 | 1.045 | 0.914 | 1.174 | 0.852 | 0.11 | 0.95 | 7.34 |
| COM. EX. 1 | 1.012 | 0.988 | 1.024 | 1.092 | 0.916 | 0.16 | 1.07 | 0.9 |
| COM. EX. 2 | 1.029 | 0.971 | 1.060 | 1.202 | 0.832 | 0.10 | 1.11 | 5 |
| COM. EX. 3 | 1.047 | 0.952 | 1.099 | 1.198 | 0.835 | 0.18 | 1.12 | 1.25 |
| COM. EX. 4 | 0.991 | 1.009 | 0.982 | 1.355 | 0.738 | 0.17 | 1.08 | 0.1 |
| COM. EX. 5 | 1.012 | 0.988 | 1.024 | 0.965 | 1.036 | 0.13 | 1.00 | 6.82 |
| COM. EX. 6 | 0.914 | 1.086 | 0.842 | 1.066 | 0.938 | 0.12 | 0.95 | 13.1 |
| COM. EX. 7 | 0.921 | 1.079 | 0.854 | 1.150 | 0.870 | 0.15 | 1.00 | 2.4 |

Preparation of Electrode The active material thus prepared, acetylene black and polytetrafluoroethylene were mixed in a ratio of 100:10:5 in a mortar, and the mixture was press-molded into a pellet having a diameter of 20 mm and a weight of 0.10 g. At this time, a titanium mesh for use as a collector was pressed along with the pellet. A titanium wire was spot-welded from the titanium mesh to the pellet to establish a current collection line. Thus, an electrode was prepared for evaluation thereof.

Evaluation of Electrode

Figure 4:
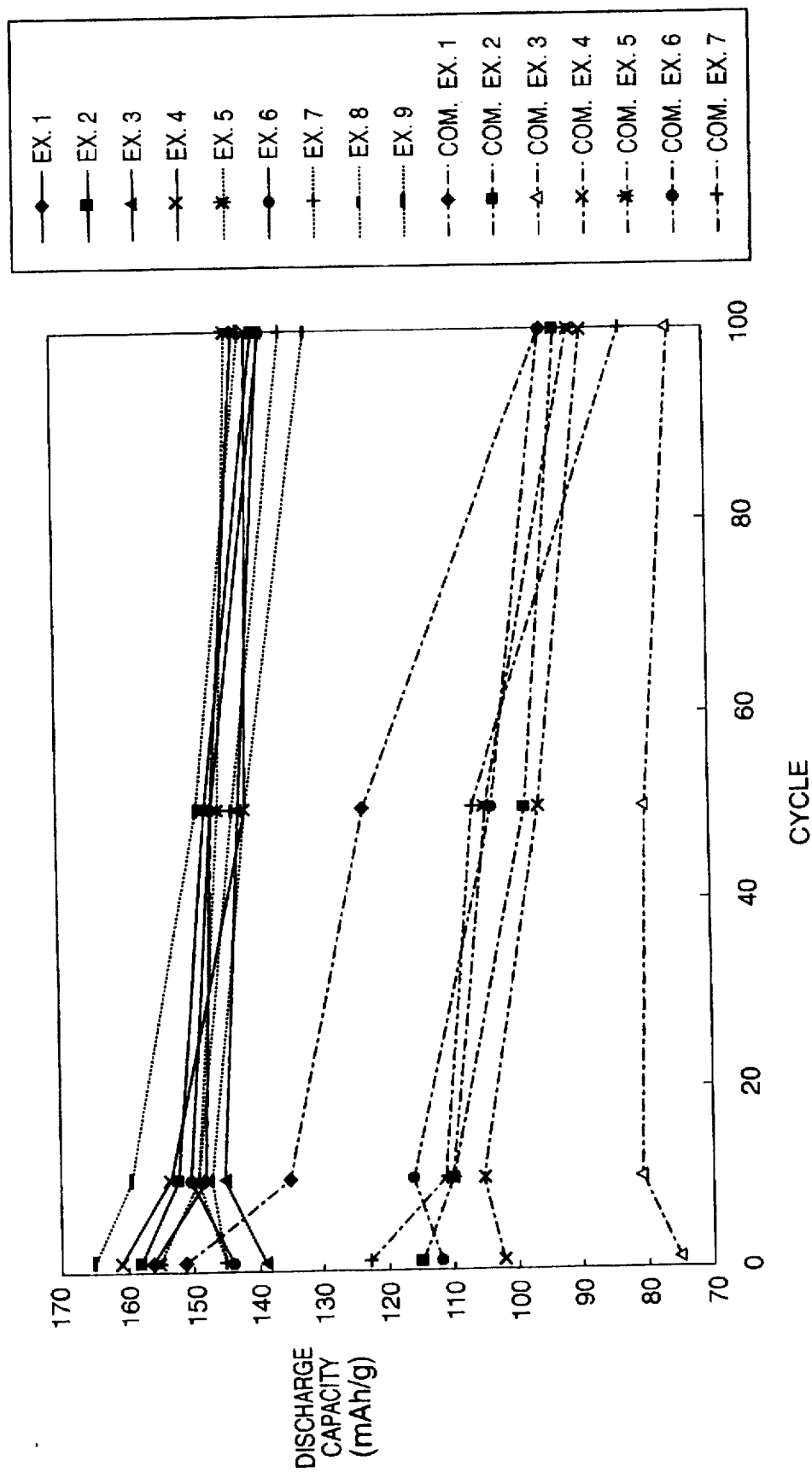
FIG. 4 is a graphical representation illustrating the cycle dependence of the discharge capacities of electrodes prepared in Examples 1 to 9 and Comparative Examples 1 to 7.

The electrode was evaluated by a three electrode method in which lithium electrodes were used as a counter electrode and a reference electrode. Used as an electrolytic solution was a solution containing 1 mol/l lithium perchlorate (LiClO$_4$) dissolved in propylene carbonate. In the first charge and discharge cycle, the electrode was charged at a current density of 27.4 mA/g up to 4.2 V with respect to the lithium reference electrode, and then discharged to 2.7 V at the same current density. The charge and discharge process was thereafter repeated within the same potential range and at the same current density. The results are shown in Table 2 and FIG. 4.

Figure 5:
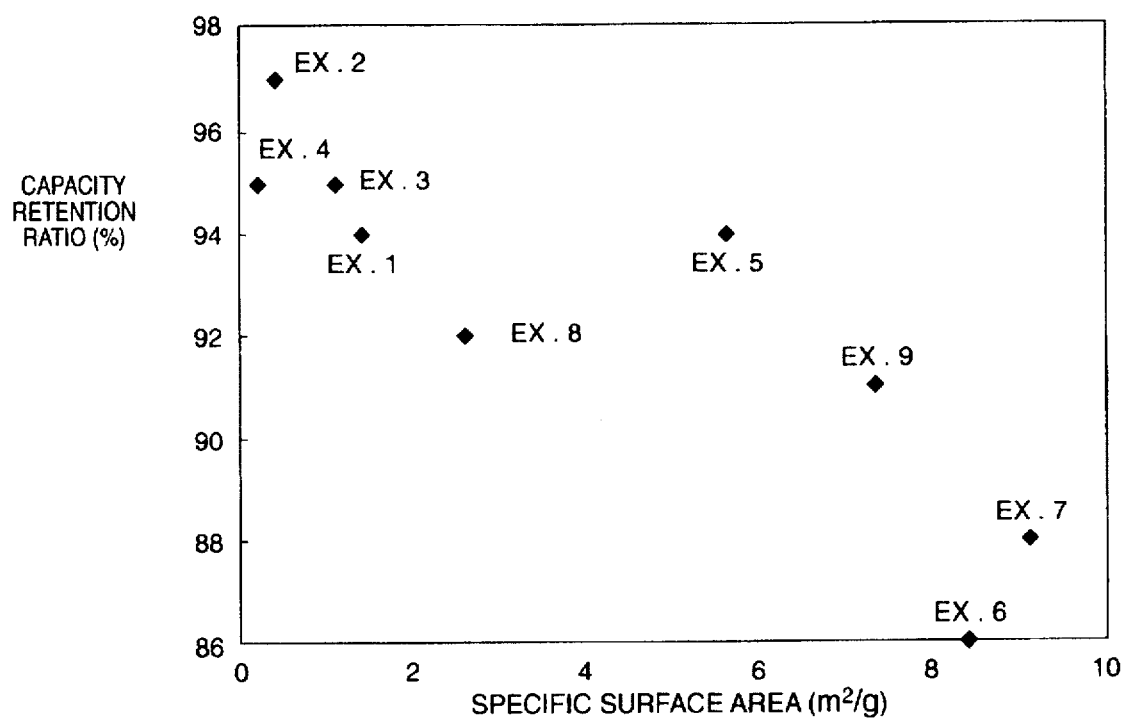
FIG. 5 is a graphical representation illustrating the relationship between the capacity retention ratio and the specific surface area for the electrodes prepared in Examples 1 to 9.

Another electrode was prepared in the aforesaid manner for evaluation of spontaneous discharge of the electrode. The electrode was charged and discharged ten times under the same conditions as described above. In turn, the electrode was charged, and allowed to storage at 20° C. for 30 days. Then, the retention capacity of the electrode was measured to determine the retention capacity ratio. The relationship between the retention capacity ratio and the specific surface area is shown in FIG. 5.

TABLE 2

| | Discharge capacity (mA/g) | | | |
|---|---|---|---|---|
| | 1st cycle | 10th cycle | 50th cycle | 100th cycle |
| Ex. 1 | 156 | 148 | 146 | 142 |
| Ex. 2 | 158 | 152 | 147 | 139 |
| Ex. 3 | 139 | 145 | 142 | 138 |
| Ex. 4 | 161 | 153 | 141 | 140 |
| Ex. 5 | 155 | 149 | 145 | 143 |
| Ex. 6 | 144 | 150 | 146 | 138 |
| Ex. 7 | 145 | 149 | 143 | 135 |
| Ex. 8 | 145 | 147 | 141 | 131 |
| Ex. 9 | 165 | 159 | 148 | 141 |
| Com. Ex. 1 | 151 | 135 | 123 | 95 |
| Com. Ex. 2 | 115 | 110 | 98 | 93 |
| Com. Ex. 3 | 75 | 81 | 80 | 76 |
| Com. Ex. 4 | 102 | 105 | 96 | 89 |
| Com. Ex. 5 | 115 | 110 | 104 | 91 |
| Com. Ex. 6 | 112 | 116 | 103 | 95 |
| Com. Ex. 7 | 123 | 111 | 106 | 83 |

Example 2

An active material was synthesized in substantially the same manner as in Example 1, except that the mixture was calcined at 900° C. for 5 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:20:15.

The electrode was evaluated in substantially the same manner as in Example 1, except that the electrolytic solution was prepared by dissolving 1 mol/l lithium perchlorate in a solvent mixture containing ethylene carbonate anddiethyl carbonate inaratioof 1:1 (storage characteristic). The results are shown in Table 2 and FIGS. 4 and 5.

Example 3

An active material was synthesized in substantially the same manner as in Example 1, except that lithium peroxide (Li$_2$O$_2$) and nickel oxide (NiO) were used as the starting materials. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:5:3.

The electrode was evaluated in substantially the same manner as in Example 1, except that the electrolytic solution was prepared by dissolving 1 mol/l lithium phosphorus hexafluoride (LiPF$_6$) in a solvent mixture containing ethylene carbonate and diethyl carbonate in a ratio of 1:1. The results are shown in Table 2 and FIGS. 4 and 5.

Example 4

An active material was synthesized in substantially the same manner as in Example 1, except that lithium peroxide (Li$_2$O$_2$) and nickel oxyhydroxide (NiOOH) were used as the starting materials and the mixture was calcined at 600° C. for 8 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:10:7.

The electrode was evaluated in substantially the same manner as in Example 1, except that the electrolytic solution was prepared by dissolving 1 mol/l lithium phosphorus hexafluoride (LiPF$_6$) in a solvent mixture containing propylene carbonate and ethylmethyl carbonate in a ratio of 1:1. The results are shown in Table 2 and FIGS. 4 and 5.

Example 5

An active material was synthesized in substantially the same manner as in Example 1, except that the mixture was calcined at 800° C. for 10 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:30:25.

The electrode was evaluated in substantially the same manner as in Example 1, except that the electrolytic solution was prepared by dissolving 1 mol/l lithium perchlorate in a solvent mixture containing ethylene carbonate and dimethyl carbonate in a ratio of 1:1. The results are shown in Table 2 and FIGS. 4 and 5.

Example 6

An active material was synthesized in substantially the same manner as in Example 3, except that the mixture was calcined at 850° C. for 5 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:4:3.

The electrode was evaluated in substantially the same manner as in Example 1, except that the electrolytic solution was prepared by dissolving 1 mol/l lithium perchlorate in a solvent mixture containing propylene carbonate and dimethyl carbonate in a ratio of 1:1. The results are shown in Table 2 and FIGS. 4 and 5.

Example 7

An active material was synthesized in substantially the same manner as in Example 1, except that lithium hydroxide (LiOH) and nickel oxide (NiO) as the starting materials were mixed in a ratio of Li:Ni=1.2:1 and the mixture was calcined at 750° C. for 24 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:10:7.

The electrode was evaluated in substantially the same manner as in Example 1, except that the electrolytic solution was prepared by dissolving 1 mol/l lithium phosphorus hexafluoride in a solvent mixture containing ethylene carbonate and diethyl carbonate in a ratio of 1:1. The results are shown in Table 2 and FIGS. 4 and 5.

Example 8

An active material was synthesized in substantially the same manner as in Example 1, except that lithium oxide ($Li_2O$) and nickel oxide (NiO) were used as the starting materials. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:15:10.

The electrode was evaluated in substantially the same manner as in Example 1, except that the electrolytic solution was prepared by dissolving 1 mol/l lithium phosphorus hexafluoride in a solvent mixture containing ethylene carbonate and diethyl carbonate in a ratio of 1:1. The results are shown in Table 2 and FIGS. 4 and 5.

Example 9

An active material was synthesized in substantially the same manner as in Example 3, except that the mixture was calcined at 800° C. for 7 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:4:3.

The electrode was evaluated in substantially the same manner as in Example 1, except that the electrolytic solution was prepared by dissolving 1 mol/l lithium phosphorus hexafluoride in a solvent mixture containing propylene carbonate and dimethyl carbonate in a ratio of 1:1. The results are shown in Table 2 and FIGS. 4 and 5.

Comparative Example 1

An active material was synthesized in substantially the same manner as in Example 1, except that the mixture was calcined at 650° C. for 5 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:10:10.

The electrode was evaluated in substantially the same manner as in Example 1, except that the electrolytic solution was prepared by dissolving 1 mol/l lithium perchlorate in a solvent mixture containing ethylene carbonate and diethyl carbonate in a ratio of 1:1. The results are shown in Table 2 and FIG. 4.

Comparative Example 2

An active material was synthesized in substantially the same manner as in Example 1, except that the starting materials were mixed in a ratio of Li:Ni=1.2:1 and the mixture was calcined at 600° C. for 15 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:10:10.

The electrode was evaluated in substantially the same manner as in Example 1, except that the electrolytic solution was prepared by dissolving 1 mol/l lithium perchlorate in a solvent mixture containing ethylene carbonate and dimethyl carbonate in a ratio of 1:1. The results are shown in Table 2 and FIG. 4.

Comparative Example 3

An active material was synthesized in substantially the same manner as in Example 7, except that the mixture was calcined at 650° C. for 15 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:10:10.

The electrode was evaluated in substantially the same manner as in Example 1, except that the electrolytic solution was prepared by dissolving 1 mol/l lithium perchlorate in a solvent mixture containing propylene carbonate and diethyl carbonate in a ratio of 1:1. The results are shown in Table 2 and FIG. 4.

Comparative Example 4

An active material was synthesized in substantially the same manner as in Example 3, except that the mixture was calcined at 650° C. for 10 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:10:10.

The electrode was evaluated in substantially the same manner as in Example 1, except that the electrolytic solution was prepared by dissolving 1 mol/l lithium phosphorus hexafluoride in a solvent mixture containing propylene carbonate and diethyl carbonate in a ratio of 1:1. The results are shown in Table 2 and FIG. 4.

Comparative Example 5

An active material was synthesized in substantially the same manner as in Example 7, except that the mixture was calcined at 900° C. for 15 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:10:10.

The electrode was evaluated in substantially the same manner as in Example 1, except that the electrolytic solution was prepared by dissolving 1 mol/l lithium phosphorus hexafluoride in a solvent mixture containing propylene carbonate and dimethyl carbonate in a ratio of 1:1. The results are shown in Table 2 and FIG. 4.

Comparative Example 6

An active material was synthesized in substantially the same manner as in Example 7, except that the starting materials were mixed in a ratio of Li:Ni=1:1 and the mixture was calcined at 650° C. for 24 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:10:10.

The electrode was evaluated in substantially the same manner as in Example 1, except that the electrolytic solution was prepared by dissolving 1 mol/l lithium phosphorus hexafluoride in a solvent mixture containing propylene carbonate and ethylmethyl carbonate in a ratio of 1:1. The results are shown in Table 2 and FIG. 4.

Comparative Example 7

An active material was synthesized in substantially the same manner as in Example 1, except that lithium hydroxide (LiOH) and nickel oxide (NiO) as the starting materials were mixed in a ratio of Li:Ni=1.1:1 and the mixture was calcined at 900° C. for 3 hours. The active material was analyzed in the same manner as in Example 1. The results are shown in Table 1.

An electrode was prepared in substantially the same manner as in Example 1, except that the active material, acetylene black and polytetrafluoroethylene were mixed in a ratio of 100:10:10.

The electrode was evaluated in substantially the same manner as in Example 1, except that the electrolytic solution was prepared by dissolving 1 mol/l lithium phosphorus hexafluoride in a solvent mixture containing propylene carbonate and ethylmethyl carbonate in a ratio of 1:1. The results are shown in Table 2 and FIG. 4.

A comparison between Examples 1 to 9 and Comparative Examples 1 to 7 indicates that the electrodes containing the active materials of the present invention each exhibit a greater discharge capacity and superior cycle characteristics. Further, it is confirmed that the active materials having a specific surface area of 0.2 $m^2/g$ to 10 $m^2/g$ each have superior charge and discharge characteristics and that the active materials having a specific surface area of 0.2 $m^2/g$ to 6 $m^2/g$ each have a superior spontaneous discharge characteristic.

Example 10

Synthesis of Lithium Nickelate

Lithium hydroxide and nickel oxyhydroxide (NiOOH) were weighed in a ratio of Li:Ni=1.2:1, and mixed in a mortar. In turn, the mixture was formed into a pellet by applying thereto a pressure of 100 kg/cm². The pellet was calcined at 600° C. in an oxygen atmosphere for 15 hours. Thus, an active material of a lithium nickelate compound was prepared. The active material was analyzed in the same manner as in Example 1. The results are shown in Table 3.

TABLE 3

(a)

|  | a-axis length (nm) | c-axis length (nm) | 3a-site occupation rate of Li | 3b-site occupation rate of Li | 3a-site⊖3b-site occupation rate of Ni rate | 6c-site occupation ofNi | Position of O [Z-parameter] | $R_{wp}$ (%) | $R_e$ (%) |
|---|---|---|---|---|---|---|---|---|---|
| EX. 10 | 0.28797 | 1.42116 | 0.9792 | 0.057 | 0.028 | 0.943 | 1 | 0.2419 | 10.8 | 5.6 |
| EX. 11 | 0.28779 | 1.41940 | 0.971 | 0.068 | 0.029 | 0.932 | 1 | 0.2423 | 10.6 | 5.7 |
| EX. 12 | 0.28784 | 1.42046 | 0.973 | 0.071 | 0.026 | 0.929 | 1 | 0.2419 | 9.6 | 5.1 |
| EX. 13 | 0.28784 | 1.42065 | 0.976 | 0.071 | 0.023 | 0.929 | 1 | 0.2419 | 10.3 | 5.5 |
| EX. 14 | 0.28783 | 1.42051 | 0.985 | 0.073 | 0.015 | 0.927 | 1 | 0.2420 | 10.9 | 5.5 |
| EX. 15 | 0.28786 | 1.42073 | 0.977 | 0.089 | 0.023 | 0.911 | 1 | 0.2421 | 10.6 | 5.6 |
| COM. EX. 8 | 0.28791 | 1.42007 | 0.960 | 0.059 | 0.040 | 0.941 | 1 | 0.2430 | 10.6 | 5.5 |
| COM. EX. 9 | 0.28807 | 1.42045 | 0.952 | 0.060 | 0.048 | 0.940 | 1 | 0.2430 | 10.5 | 5 |
| COM. EX. 10 | 0.28814 | 1.42072 | 0.951 | 0.000 | 0.048 | 1.000 | 1 | 0.2418 | 11.1 | 5.5 |
| COM. EX. 11 | 0.28692 | 1.41744 | 0.991 | 0.000 | 0.009 | 1.000 | 1 | 0.2413 | 13.1 | 7.1 |
| COM. EX. 12 | 0.28819 | 1.42011 | 0.914 | 0.000 | 0.086 | 1.000 | 1 | 0.2417 | 11.9 | 6.3 |
| COM. EX. 13 | 0.28815 | 1.42083 | 0.970 | 0.045 | 0.030 | 0.955 | 1 | 0.2429 | 10.8 | 5.6 |

(b)

|  | 3a- and 3b-site occupation rate of Li($a_{Li}$) | 3a- and 3b-site occupation rate of Ni($a_{Ni}$) | $a_{Li}/a_{Ni}$ | I(003)/I(104) | I(104)/I(003) | Half width of peak of (003) plane | Li/Ni (Chemical analysis) | BET specific surface area ($m^2/g$) |
|---|---|---|---|---|---|---|---|---|
| EX. 10 | 1.029 | 0.971 | 1.060 | 1.202 | 0.832 | 0.10 | 1.11 | 5 |
| EX. 11 | 1.039 | 0.961 | 1.082 | 1.174 | 0.852 | 0.11 | 1.09 | 0.75 |
| EX. 12 | 1.044 | 0.955 | 1.092 | 1.197 | 0.835 | 0.14 | 1.13 | 2.8 |
| EX. 13 | 1.047 | 0.952 | 1.099 | 1.198 | 0.835 | 0.18 | 1.12 | 1.25 |
| EX. 14 | 1.058 | 0.942 | 1.123 | 1.231 | 0.812 | 0.15 | 1.20 | 9.8 |
| EX. 15 | 1.066 | 0.934 | 1.141 | 1.182 | 0.846 | 0.10 | 1.18 | 0.25 |
| COM. EX. 8 | 1.019 | 0.981 | 1.038 | 1.120 | 0.893 | 0.13 | 1.05 | 0.4 |

TABLE 3-continued

| | | | | | | | | |
|---|---|---|---|---|---|---|---|---|
| COM. EX. 9 | 1.012 | 0.988 | 1.024 | 1.092 | 0.916 | 0.16 | 1.07 | 0.9 |
| COM. EX. 10 | 0.951 | 1.048 | 0.907 | 1.184 | 0.845 | 0.11 | 0.92 | 0.29 |
| COM. EX. 11 | 0.991 | 1.009 | 0.982 | 1.355 | 0.738 | 0.17 | 1.08 | 0.1 |
| COM. EX. 12 | 0.914 | 1.086 | 0.842 | 1.066 | 0.938 | 0.12 | 0.95 | 13.1 |
| COM. EX. 13 | 1.015 | 0.985 | 1.030 | 1.130 | 0.885 | 0.21 | 1.16 | 1.3 |

Preparation of Electrode

The active material thus prepared, acetylene black and polytetrafluoroethylene were mixed in a ratio of 100:10:10 in a mortar, and the mixture was press-molded into a pellet having a diameter of 20 mm and a weight of 0.10 g. At this time, a titanium mesh for use as a collector was pressed along with the pellet. A titanium wire was spot-welded from the titanium mesh to the pellet to establish a current collection line. Thus, an electrode was prepared for evaluation thereof.

Evaluation of Electrode

Figure 6:
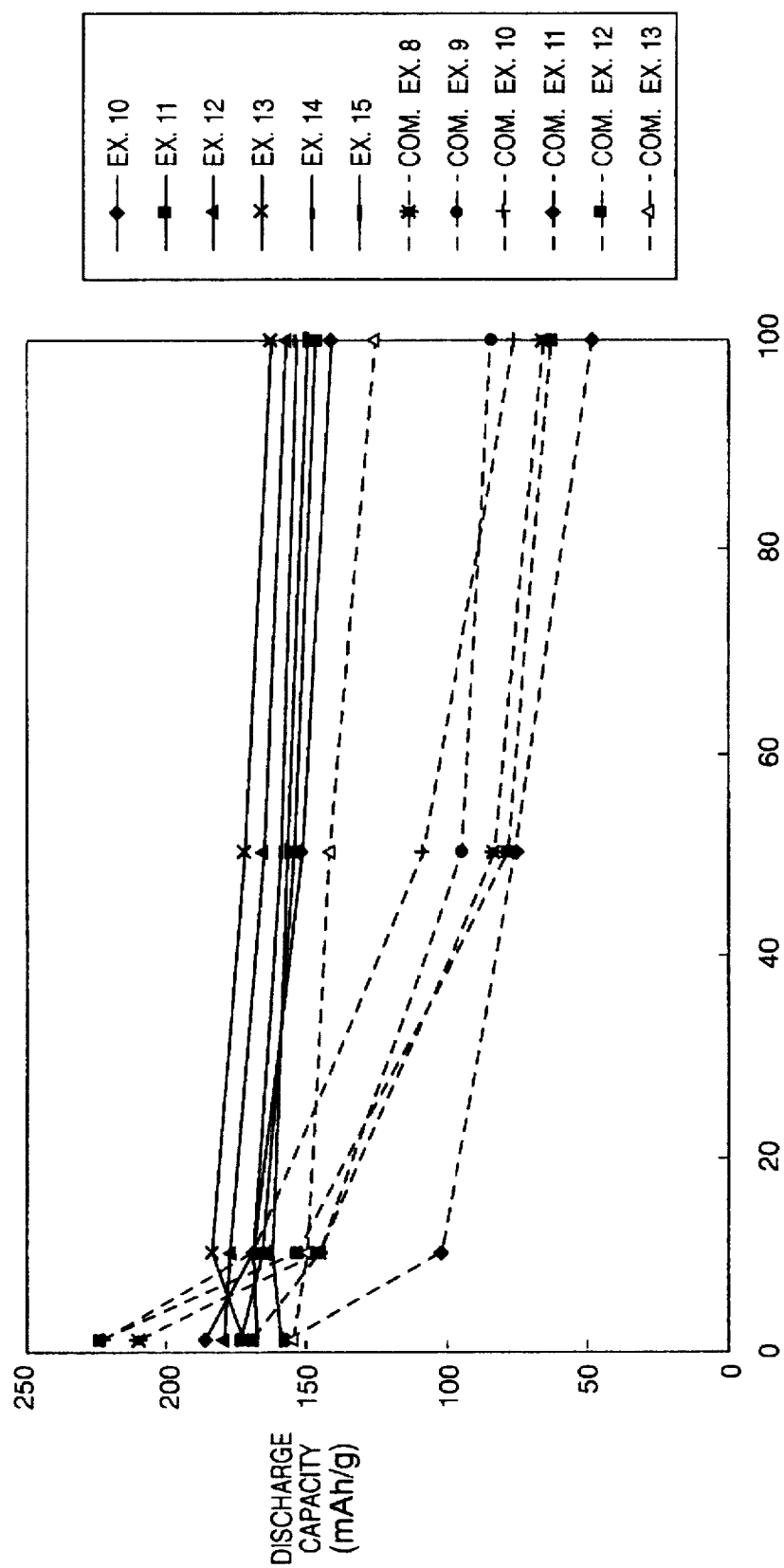
FIG. 6 is a graphical representation illustrating the cycle dependence of the discharge capacities of electrodes prepared in Examples 10 to 15 and Comparative Examples 8 to 13.

The electrode was evaluated by a three electrode method in which lithium electrodes were used as a counter electrode and a reference electrode. Used as an electrolytic solution was a solution in which 1 mol/l lithium perchlorate (LiClO$_4$) was dissolved in a solvent mixture containing ethylene carbonate and dimethyl carbonate in a ratio of 1:1. In the first charge and discharge cycle, the electrode was charged at a current density of 27.4 mA/g up to 4.5 V with respect to the lithium reference electrode, and then discharged to 2.7 V at the same current density. The charge and discharge process was thereafter repeated within the same potential range and at the same current density. The results are shown in Table 4 and FIG. 6.

Figure 7:
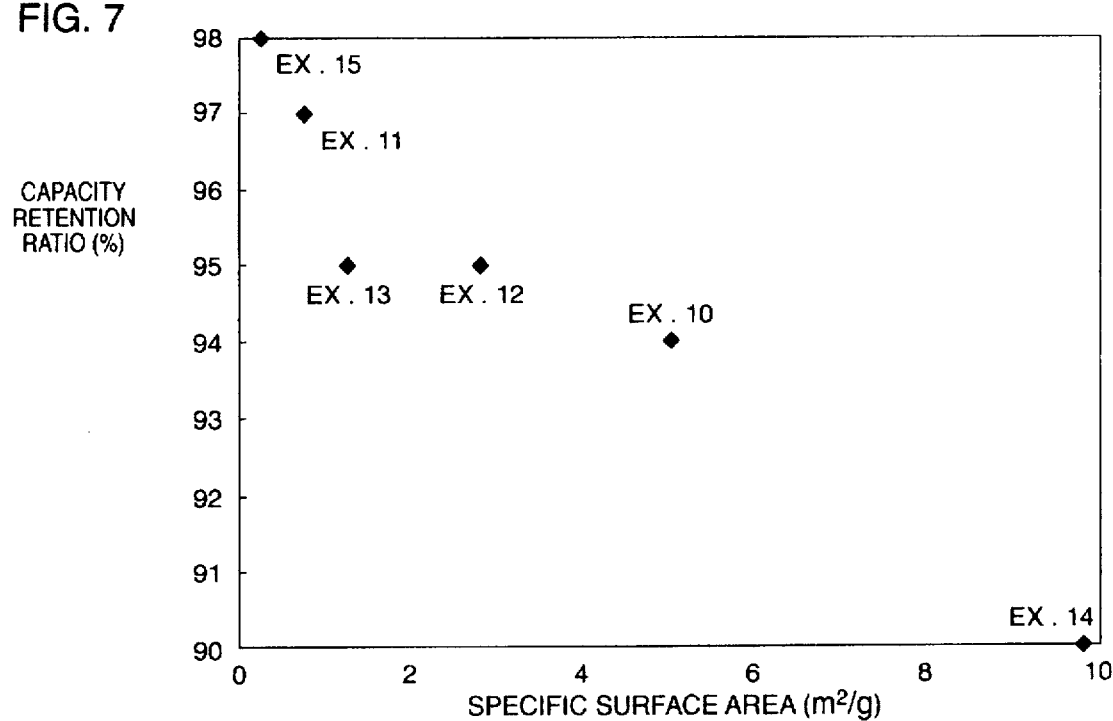
FIG. 7 is a graphical representation illustrating the relationship between the capacity retention ratio and the specific surface area for the electrodes prepared in Examples 10 to 15.

Further, the retention capacity rate of the electrode was determined in the same manner as in Example 1. The relationship between the retention capacity ratio and the specific surface area is shown in FIG. 7.

TABLE 4

| | Discharge capacity (mA/g) | | | |
|---|---|---|---|---|
| | 1st cycle | 10th cycle | 50th cycle | 100th cycle |
| Ex. 10 | 185 | 168 | 152 | 143 |
| Ex. 11 | 173 | 165 | 155 | 148 |
| Ex. 12 | 179 | 177 | 165 | 159 |
| Ex. 13 | 172 | 183 | 171 | 163 |
| Ex. 14 | 168 | 168 | 159 | 155 |
| Ex. 15 | 159 | 162 | 157 | 151 |
| Com. Ex. 8 | 210 | 145 | 83 | 68 |
| Com. Ex. 9 | 170 | 145 | 95 | 86 |
| Com. Ex. 10 | 220 | 168 | 109 | 78 |
| Com. Ex. 11 | 157 | 102 | 76 | 50 |
| Com. Ex. 12 | 223 | 153 | 78 | 65 |
| Com. Ex. 13 | 155 | 150 | 142 | 128 |

Example 11

An active material was synthesized in substantially the same manner as in Example 10, except that lithium oxide (Li$_2$O) and nickel oxyhydroxide (NiOOH) were used as the starting materials and the mixture was calcined at 700° C. for 24 hours. The active material was analyzed in the same manner as in Example 1. The results are shown in Table 3.

An electrode was prepared in substantially the same manner as in Example 10, except that the active material, acetylene black and polytetrafluoroethylene were mixed in a ratio of 100:30:25.

The electrode was evaluated in substantially the same manner as in Example 10, except that the electrolytic solution was prepared by dissolving 1 mol/l lithium phosphorus hexafluoride (LiPF$_6$) in a solvent mixture containing propylene carbonate and ethylmethyl carbonate in a ratio of 1:1. The results are shown in Table 4 and FIGS. 6 and 7.

Example 12

An active material was synthesized in substantially the same manner as in Example 10, except that lithiumhydroxide (LIOH) andnickel oxide (NiO) were used as the starting materials and the mixture was calcined at 700° C. for 10 hours. The active material was analyzed in the same manner as in Example 1. The results are shown in Table 3.

An electrode was prepared in substantially the same manner as in Example 10, except that the active material, acetylene black and polytetrafluoroethylene were mixed in a ratio of 100:4:3.

The electrode was evaluated in substantially the same manner as in Example 10, except that the electrolytic solution was prepared by dissolving 1 mol/l lithium phosphorus hexafluoride in a solvent mixture containing propylene carbonate and dimethyl carbonate in a ratio of 1:1. The results are shown in Table 4 and FIGS. 6 and 7.

Example 13

An active material was synthesized in substantially the same manner as in Example 12, except that the mixture was calcined at 650° C. for 15 hours. The active material was analyzed in the same manner as in Example 1. The results are shown in Table 3.

An electrode was prepared in substantially the same manner as in Example 10, except that the active material, acetylene black and polytetrafluoroethylene were mixed in a ratio of 100:10:10.

The electrode was evaluated in substantially the same manner as in Example 10, except that the electrolytic solution was prepared by dissolving 1 mol/l lithium perchlorate in a solvent mixture containing propylene carbonate and diethyl carbonate in a ratio of 1:1. The results are shown in Table 4 and FIGS. 6 and 7.

Example 14

An active material was synthesized in substantially the same manner as in Example 12, except that the starting materials were mixed in a ratio of Li:Ni=1.3:1 and the mixture was calcined at 750° C. for 10 hours. The active material was analyzed in the same manner as in Example 1. The results are shown in Table 3.

An electrode was prepared in substantially the same manner as in Example 10, except that the active material, acetylene black and polytetrafluoroethylene were mixed in a ratio of 100:10:7.

The electrode was evaluated in substantially the same manner as in Example 10, except that the electrolytic solution was prepared by dissolving 1 mol/l lithium phosphorus hexafluoride in a solvent mixture containing ethylene carbonate and diethyl carbonate in a ratio of 1:1. The results are shown in Table 4 and FIGS. 6 and 7.

Example 15

An active material was synthesized in substantially the same manner as in Example 10, except that lithium oxide ($Li_2O$) and nickel hydroxide ($Ni(OH)_2$) as the starting materials were mixed in a ratio of Li:Ni=1.3:1 and the mixture was calcined at 750° C. for 10 hours. The active material was analyzed in the same manner as in Example 1. The results are shown in Table 3.

An electrode was prepared in substantially the same manner as in Example 10, except that the active material, acetylene black and polytetrafluoroethylene were mixed in a ratio of 100:20:10.

The electrode was evaluated in substantially the same manner as in Example 10, except that the electrolytic solution was prepared by dissolving 1 mol/l lithium phosphorus hexafluoride in propylene carbonate. The results are shown in Table 4 and FIGS. 6 and 7.

Comparative Example 8

An active material was synthesized in substantially the same manner as in Example 10, except that the starting materials were mixed in a ratio of Li:Ni=1.1:1 and the mixture was calcined at 900° C. for 5 hours. The active material was analyzed in the same manner as in Example 1. The results are shown in Table 3.

An electrode was prepared in substantially the same manner as in Example 10, except that the active material, acetylene black and polytetrafluoroethylene were mixed in a ratio of 100:20:15.

The electrode was evaluated in substantially the same manner as in Example 10, except that the electrolytic solution was prepared by dissolving 1 mol/l lithium perchlorate in a solvent mixture containing ethylene carbonate and diethyl carbonate in a ratio of 1:1. The results are shown in Table 4 and FIG. 6.

Comparative Example 9

An active material was synthesized in substantially the same manner as in Comparative Example 8, except that the mixture was calcined at 650° C. for 5 hours. The active material was analyzed in the same manner as in Example 1. The results are shown in Table 3.

An electrode was prepared in substantially the same manner as in Example 10, except that the active material, acetylene black and polytetrafluoroethylene were mixed in a ratio of 100:10:10.

The electrode was evaluated in substantially the same manner as in Example 10, except that the electrolytic solution was prepared by dissolving 1 mol/l lithium perchlorate in a solvent mixture containing ethylene carbonate and diethyl carbonate in a ratio of 1:1. The results are shown in Table 4 and FIG. 6.

Comparative Example 10

An active material was synthesized in substantially the same manner as in Example 10, except that lithium hydroxide (LiOH) and nickel hydroxide ($Ni(OH)_2$) as the starting materials were mixed in a ratio of Li:Ni=1:1 and the mixture was calcined at 750° C. for 5 hours. The active material was analyzed in the same manner as in Example 1. The results are shown in Table 3.

An electrode was prepared in substantially the same manner as in Example 10, except that the active material, acetylene black and polytetrafluoroethylene were mixed in a ratio of 100:7:5.

The electrode was evaluated in substantially the same manner as in Example 10, except that the electrolytic solution was prepared by dissolving 1 mol/l lithium perchlorate in propylene carbonate. The results are shown in Table 4 and FIG. 6.

Comparative Example 11

An active material was synthesized in substantially the same manner as in Comparative Example 8, except that lithium oxide ($Li_2O$) and nickel oxide (NiO) were used as the starting materials and the mixture was calcined at 650° C. for 10 hours. The active material was analyzed in the same manner as in Example 1. The results are shown in Table 3.

An electrode was prepared in substantially the same manner as in Example 10, except that the active material, acetylene black and polytetrafluoroethylene were mixed in a ratio of 100:10:10.

The electrode was evaluated in substantially the same manner as in Example 10, except that the electrolytic solution was prepared by dissolving 1 mol/l lithium phosphorus hexafluoride in a solvent mixture containing propylene carbonate and diethyl carbonate in a ratio of 1:1. The results are shown in Table 4 and FIG. 6.

Comparative Example 12

An active material was synthesized in substantially the same manner as in Example 10, except that lithium hydroxide (LiOH) and nickel oxide (NiO) as the starting materials were mixed in a ratio of Li:Ni=1:1 and the mixture was calcined at 650° C. for 24 hours. The active material was analyzed in the same manner as in Example 1. The results are shown in Table 3.

An electrode was prepared in substantially the same manner as in Example 10, except that the active material, acetylene black and polytetrafluoroethylene were mixed in a ratio of 100:10:10.

The electrode was evaluated in substantially the same manner as in Example 10, except that the electrolytic solution was prepared by dissolving 1 mol/l lithium phosphorus hexafluoride in a solvent mixture containing propylene carbonate and ethylmethyl carbonate in a ratio of 1:1. The results are shown in Table 4 and FIG. 6.

Comparative Example 13

An active material was synthesized in substantially the same manner as in Example 10, except that lithium hydroxide (LiOH) and nickel oxide (NiO) as the starting materials were mixed in a ratio of Li:Ni=1.2:1 and the mixture was calcined at 700° C. for 3 hours. The active material was analyzed in the same manner as in Example 1. The results are shown in Table 3.

An electrode was prepared in substantially the same manner as in Example 10, except that the active material, acetylene black and polytetrafluoroethylene were mixed in a ratio of 100:10:10.

The electrode was evaluated in substantially the same manner as in Example 10, except that the electrolytic solution was prepared by dissolving 1 mol/l lithium phosphorus hexafluoride in a solvent mixture containing propylene carbonate and ethylmethyl carbonate in a ratio of 1:1. The results are shown in Table 4 and FIG. 6.

A comparison between Examples 10 to 15 and Comparative Examples 8 to 13 indicates that the electrodes containing the active materials of the present invention each exhibit a greater discharge capacity even if the electrodes are charged up to a higher potential. Further, it is confirmed that the active materials having a specific surface area of 0.2 m²/g to 10 m²/g each have superior charge and discharge characteristics and that the active materials having a specific surface area of 0.2 m²/g to 6 m²/g (particularly, 0.2 m²/g to 5 m²/g) each have a superior spontaneous discharge characteristic(storage characteristic).

Example 16

Synthesis of Positive Electrode Active Substance and Preparation of Positive Electrode In the same manner as in Example 1, a positive electrode active material of a lithium nickelate compound was synthesized, and a positive electrode was prepared by forming the positive electrode active material into a pellet having a diameter of 15 mm and a weight of 50 mg.

Preparation of Negative Electrode

A negative electrode was formed of a pyrolytic carbon material. More specifically, a starting material of propane was pyrolyzed at 750° C. in a gas phase under atmospheric pressure, and the resulting pyrolytic carbon was deposited on a nickel substrate (surface area: 4 cm²) for 2 hours.

The X-ray diffractometry showed that the interfacial distance $d_{002}$ of (002) plane of the pyrolytic carbon material was 0.337 nm and the crystalline unit cell thickness Lc along (002) plane was 15 nm. The argon laser Raman spectrometry showed that the ratio of a peak intensity at around 1360 cm$^{-1}$ to that at around 1580 cm$^{-1}$ (R value) was 0.46. A nickel wire was spot-welded on the nickel substrate of the negative electrode to establish a current collection line. The negative electrode was dried at 200° C. under reduced pressure for removing moisture therefrom. The negative electrode contained 25 mg of the negative electrode active material.

Evaluation of Battery

A battery of beaker type cell was fabricated by using the positive and negative electrodes prepared in the aforesaid manner. Used as an electrolytic solution was a solution in which 1 mol/l lithium perchlorate was dissolved in a solvent mixture containing propylene carbonate and diethyl carbonate in a ratio of 1:1. The battery thus fabricated was evaluated through a chargedischarge test in which the battery was charged up to 4.2 V at a current of 0.2 mA, and discharged to 2.5 V at the same current in the first charge and discharge cycle. The charge and discharge process was thereafter repeated within the same voltage range and at the same current density for evaluation of the battery.

As a result, the discharge capacity of the battery was 6.5 mAh in the first cycle and 6.0 mAh in the 100th cycle.

Example 17

Synthesis of Positive Electrode Active Substance and Preparation of Positive Electrode A positive electrode active material of a lithium nickelate compound was synthesized in the same manner as in Example 4. A positive electrode of a pellet having a diameter of 15 mm and a thickness of 0.77 mm and containing 200 mg of the positive electrode active material was prepared in substantially the same manner as in Example 1.

Preparation of Negative Electrode

Natural graphite (produced in Madagascar, flaky, particle diameter: 11 μm, $d_{002}$: 0.337 nm, Lc: 27 nm, La: 17 nm, R value: 0, specific surface area: 8 m²/g) was employed as a negative electrode active material. The natural graphite and polytetrafluoroethylene were mixed in a ratio of 10:1, and the mixture was press-molded into a pellet having a diameter of 15 mm and a thickness of 0.57 mm and containing 90 mg of the negative electrode active material. At this time, a nickel mesh for use as a collector was pressed along with the pellet. The pellet thus prepared was dried at 200° C. under reduced pressure for removing moisture therefrom. Thus, a negative electrode was prepared.

Fabrication of Battery

A coin-type battery as shown in FIG. 2 was fabricated in the following manner. The positive electrode 3 including the positive electrode collector 2 was press-fitted in a positive electrode case 1 including an insulation packing 8 fitted therein. A separator 7 of a polypropylene nonwoven fabric was placed on the positive electrode 3, and impregnated with an electrolytic solution in which an electrolytic salt LiPF$_6$ was dissolved in a concentration of 1 mol/l in a solvent mixture containing ethylene carbonate, propylene carbonate and diethyl carbonate in a volume ratio of 2:1:3. The negative electrode 6 including the negative electrode collector 5 to be fitted in a negative electrode case 4 was placed on the separator 7. In turn, the positive electrode case 1 was pressedly secured to the negative electrode case 4 with the insulation packing 8 interposed therebetween for sealing. Thus, the coin-type battery was fabricated.

Evaluation of Battery

The coin-type battery thus fabricated was evaluated by measuring the discharge capacity thereof. More specifically, the battery was charged at a charge current of 1 mA up to an upper limit charge voltage of 4.2 V, and then discharged at a discharge current of 1 mA to a lower limit voltage of 2.5 V in the first charge and discharge cycle. The charge and discharge process was thereafter repeated within the same voltage range and at the same current density for the evaluation of the battery.

As a result, the discharge capacity of the battery was 25.8 mAh in the first cycle and 22.5 mAh in the 100th cycle.

Example 18

A cylindrical battery as shown in FIG. 3 was fabricated in the following manner.

First, a positive electrode was prepared. More specifically, 100 parts by weight of the positive electrode active material (lithium nickelate) prepared in Example 1, 7 parts by weight of powdery acetylene black as a conductive material and 10 parts by weight of polyvinylidene fluoride as a binder were mixed in N-methyl-2-pyrrolidone as a dispersant to afford a positive electrode paste. In turn, the positive electrode paste was applied on the both sides of an aluminum foil collector having a thickness of 20 μm and dried. Then, the resulting positive electrode composite was pressed, and cut into an elongate strip. A positive electrode lead 15 of an aluminum tab was spot-welded to one end of the positive electrode strip. Thus, the positive electrode 14 was prepared. The content of the positive electrode active material (lithium nickelate) in the positive electrode was 40 mg/cm$_2$.

Next, a negative electrode was prepared. More specifically, 100 parts by weight of synthetic graphite (particle diameter: 8 μm, $d_{002}$: 0.337 nm, Lc: 25 nm, La: 13 nm, R value: 0, specific surface area: 12 m²/g) as a negative electrode active material and 10 parts by weight of polyvinylidene fluoride as a binder were mixed in N-methyl-2-pyrrolidone as a dispersant to afford a negative electrode paste. In turn, the negative electrode paste was applied on the both sides of a copper foil collector having a thickness of 18 μm and dried. Then, the resulting negative electrode composite was pressed, and cut into an elongate strip. A negative electrode lead 17 of a nickel tab was spot-welded to one end of the negative electrode strip. Thus, the negative electrode 16 was prepared. The content of the negative electrode active material (graphite) in the negative electrode was 18 mg/cm².

The positive electrode 14 and the negative electrode 16 were joined to face opposite to each other with a polyethylene microporous separator 18 interposed therebetween, and spirally wound into an electrode roll. The electrode roll was inserted into an electrode case 13 of stainless (diameter: 17 mm, height: 50 mm) with the positive electrode lead 15 located upward and with the negative electrode lead 17 located downward. Then, the negative electrode lead 17 was spot-welded to a bottom of the battery case 13, and the positive electrode lead 15 was spot-welded to a positive electrode cap 11 provided with a safety valve. A center pin 19 (stainless tube having a diameter of 3.4 mm and a length of 40 mm) was inserted into the center of the electrode roll for prevention of the slack of the electrode roll. An electrolytic solution in which 1 mol/l lithium phosphorus hexafluoride as an electrolyte was dissolved in a solvent mixture containing ethylene carbonate and diethyl carbonate in a ratio of 1:1 was poured in the battery case 13, and the positive electrode cap 11 was press-fitted onto the battery case 13 with an insulation packing 12 interposed therebetween.

In the aforesaid manner, 20 cylindrical batteries were fabricated.

In a charge-discharge test, the batteries were each charged up to an upper voltage of 4.2 V at a constant charge current of 500 mA for 3 hours, and discharged to a lower voltage of 2.75 V at a constant discharge current of 100 mA in a constant temperature bath kept at 25° C. As a result, the discharge capacities of the 20 batteries ranged from 840 mAh to 875 mAh in the first cycle and from 750 mAh to 790 mAh in the 50th cycle.

Comparative Example 14

In substantially the same manner as in Example 18, 20 cylindrical batteries were fabricated, except that the lithium nickel compound synthesized in Comparative Example 1 was used as the positive electrode active. material.

The batteries were each evaluated in the same manner as in Example 18. As a result, the discharge capacities of the 20 batteries ranged from 760 mAh to 860 mAh in the first cycle and from 520 mAh to 700 mAh in the 50th cycle. A composition between Example 18 and comparative Example 14 indicates that the battery of the present invention exhibit a low variation in the charge and discharge characteristics and a high reproducibility.

Examples 19 to 27

Coin-type batteries of Examples 19 to 27 were fabricated in substantially the same manner as in Example 17, except that the lithium nickelate compounds synthesized in Examples 1 to 9 were respectively used as positive electrode active materials.

The coin-type batteries were each evaluated in substantially the same manner as in Example 17, except that the charge- discharge test was carried out at 40° C.

Figure 8:
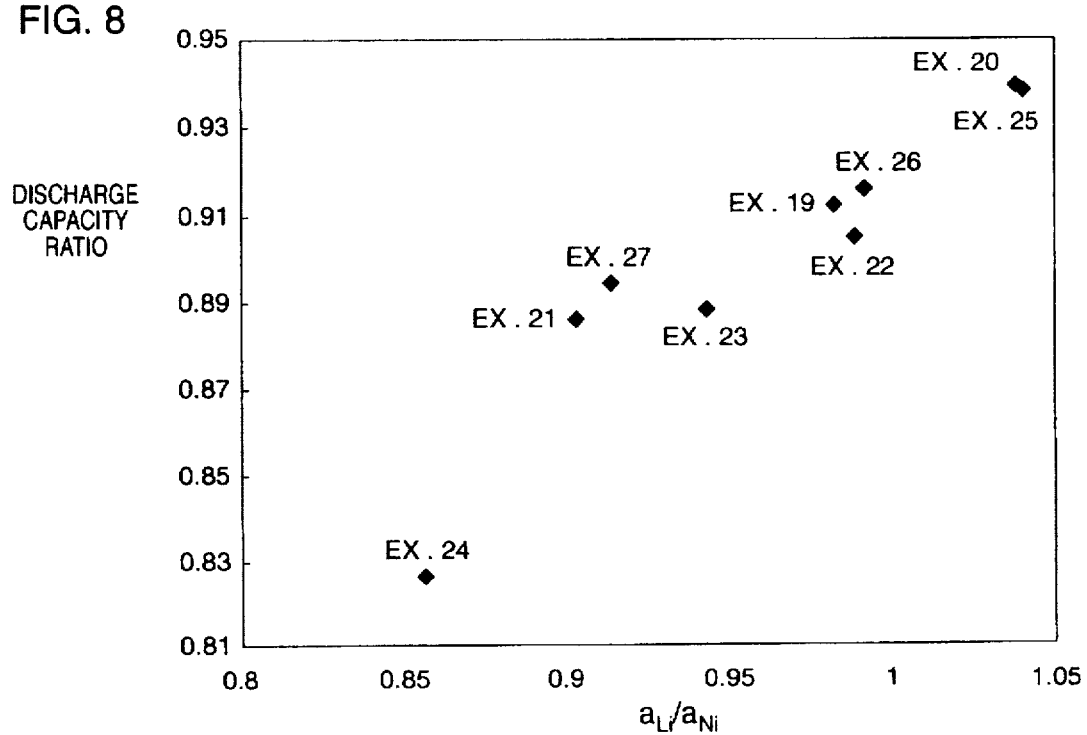
FIG. 8 is a graphical representation illustrating the relationship between the $a_L/a_{Ni}$ and the discharge capacity ratio for coin batteries fabricated in Examples 19 to 27.

The ratio of the discharge capacity in the 30th cycle to the discharge capacity in the first cycle (discharge capacity ratio=30th discharge capacity/first discharge capacity) was determined for each of the batteries. The relationship between the discharge capacity ratio and the ratio $a_{Li}/a_{Ni}$ of the 3a- and 3b-site occupation rate of lithium atoms to the 3a- and 3b-site occupation rate of nickel atoms determined by the Rietveld analysis is shown in FIG. 8.

It was confirmed that the ratio $a_{Li}/a_{Ni}$ of the lithium occupation rate to the nickel occupation rate is preferably 0.9 to 1.04, more preferably 1 to 1.04, to provide a battery exhibiting superior charge and discharge characteristics at a higher temperature.

Example 28

Synthesis of Positive Electrode Active Substance and Preparation of Positive Electrode In the same manner as in Example 10, a positive electrode active material of a lithium nickelate compound was synthesized, and a positive electrode was prepared by forming the positive electrode active material into a pellet having a diameter of 15 mm and a weight of 50 mg.

Preparation of Negative Electrode

A negative electrode was formed of a pyrolytic carbon material. More specifically, a starting material of propane was pyrolyzed at 750° C. in a gas phase under atmospheric pressure, and the resulting pyrolytic carbon was deposited on a nickel substrate (surface area: 4 $cm^2$) for 2 hours.

The X-ray diffractometry showed that the interfacial distance $d_{002}$ of (002) plane of the pyrolytic carbon material was 0.337 nm and the crystalline unit cell thickness Lc along (002) plane was 15 nm. The argon laser Raman spectrometry showed that the ratio of a peak intensity at around 1360 $cm^{-1}$ to that at around 1580 $cm^{-1}$ (R value) was 0.46. A nickel wire was spot-welded on the nickel substrate of the negative electrode to establish a current collection line. The negative electrode was dried at 200° C. under reduced pressure for removing moisture therefrom. The negative electrode contained 28 mg of the negative electrode active material.

Evaluation of Battery

A battery of beaker type cell was fabricated by using the positive and negative electrodes prepared in the aforesaid manner. Used as an electrolytic solution was a solution in which 1 mol/l lithium perchlorate was dissolved in a solvent mixture containing propylene carbonate and diethyl carbonate in a ratio of 1:1. The battery thus fabricated was evaluated through a charge-discharge test in which the battery was charged up to 4.4 V at a current of 0.2 mA, and discharged to 2.5 V at the same current in the first charge and discharge cycle. The charge and discharge process was thereafter repeated within the same voltage range and at the same current density for evaluation of the battery.

As a result, the discharge capacity of the battery was 7.0 mAh in the first cycle and 6.3 mAh in the 100th cycle.

Example 29

Synthesis of Positive Electrode Active Substance and Preparation of Positive Electrode A positive electrode active material of a lithium nickelate compound was synthesized in the same manner as in Example 12. A positive electrode of a pellet having a diameter of 15 mm and a thickness of 0.77 mm and containing 200 mg of the positive electrode active material was prepared in the same manner as in Example 10.

Preparation of Negative Electrode

Natural graphite (produced in Madagascar, flaky, particle diameter: 11 μm, $d_{002}$: 0.337 nm, Lc: 27 nm, La: 17 nm, R value: 0, specific surface area: 8 $m^2/g$) was employed as a negative electrode active material. The natural graphite and polytetrafluoroethylene were mixed in a ratio of 10:1, and the mixture was press-molded into a pellet having a diameter of 15 mm and a thickness of 0.57 mm and containing 95 mg of the negative electrode active material. At this time, a nickel mesh for use as a collector was pressed along with the pellet. The pellet thus prepared was dried at 200° C. under reduced pressure for removing moisture therefrom. Thus, a negative electrode was prepared.

Fabrication of Battery

A coin-type battery as shown in FIG. 2 was fabricated in the following manner. The positive electrode 3 including the positive electrode collector 2 was press-fitted in a positive electrode case 1 including an insulation packing 8 fitted therein. A separator 7 of a polypropylene nonwoven fabric was placed on the positive electrode 3, and impregnated with an electrolytic solution in which an electrolytic salt LiPF$_6$ was dissolved in a concentration of 1 mol/l in a solvent mixture containing ethylene carbonate, propylene carbonate and diethyl carbonate in a volume ratio of 2:1:3. The negative electrode 6 including the negative electrode collector 5 to be fitted in a negative electrode case 4 was placed on the separator 7. In turn, the positive electrode case 1 was pressedly secured to the negative electrode case 4 with the insulation packing 8 interposed therebetween for sealing. Thus, the coin-type battery was fabricated.

Evaluation of Battery

The coin-type battery thus fabricated was evaluated by measuring the discharge capacity thereof. More specifically, the battery was charged at a charge current of 1 mA up to an upper limit charge voltage of 4.45 V, and then discharged at a discharge current of 1 mA to a lower limit voltage of 2.5 V in the first charge and discharge cycle. The charge and discharge process was thereafter repeated within the same voltage range and at the same current density for the evaluation of the battery.

As a result, the discharge capacity of the battery was 29.5 mAh in the first cycle and 25.2 mAh in the 100th cycle.

Example 30

A cylindrical battery as shown in FIG. 3 was fabricated in the following manner.

First, a positive electrode was prepared. More specifically, 100 parts by weight of the positive electrode active material (lithium nickelate) prepared in Example 10, 7 parts by weight of powdery acetylene black as a conductive material and 10 parts by weight of polyvinylidene fluoride as a binder were mixed in N-methyl-2-pyrrolidone as a dispersant to afford a positive electrode paste. In turn, the positive electrode paste was applied on the both sides of an aluminum foil collector having a thickness of 20 μm and dried. Then, the resulting positive electrode composite was pressed, and cut into an elongate strip. A positive electrode lead 15 of an aluminum tab was spot-welded to one end of the positive electrode strip. Thus, the positive electrode 14 was prepared. The content of the positive electrode active material (lithium nickelate) in the positive electrode was 40 mg/cm$^2$.

Next, a negative electrode was prepared. More specifically, 100 parts by weight of synthetic graphite (particle diameter: 8 μm, d$_{002}$: 0.337 nm, Lc: 25 nm, La: 13 nm, R value: 0, specific surface area: 12 m$^2$/g) as a negative electrode active material and 10 parts by weight of polyvinylidene fluoride as a binder were mixed in N-methyl-2-pyrrolidone as a dispersant to afford a negative electrode paste. In turn, the negative electrode paste was applied on the both sides of a copper foil collector having a thickness of 18 μm and dried. Then, the resulting negative electrode composite was pressed, and cut into an elongate strip. A negative electrode lead 17 of a nickel tab was spot-welded to one end of the negative electrode strip. Thus, the negative electrode 16 was prepared. The content of the negative electrode active material (graphite) in the negative electrode was 20 mg/cm$^2$.

The positive electrode 14 and the negative electrode 16 were joined to face opposite to each other with a polyethylene microporous separator 18 interposed therebetween, and spirally wound into an electrode roll. The electrode roll was inserted into an electrode case 13 of stainless (diameter: 17 mm, height: 50 mm) with the positive electrode lead 15 located upward and with the negative electrode lead 17 located downward. Then, the negative electrode lead 17 was spot-welded to a bottom of the battery case 13, and the positive electrode lead 15 was spot-welded to a positive electrode cap 11 provided with a safety valve. A center pin 19 (stainless tube having a diameter of 3.4 mm and a length of 40 mm) was inserted into the center of the electrode roll for prevention of the slack of the electrode roll. An electrolytic solution in which 1 mol/l lithium phosphorus hexafluoride as an electrolyte was dissolved in a solvent mixture containing ethylene carbonate and diethyl carbonate in a ratio of 1:1 was poured in the battery case 13, and the positive electrode cap 11 was press-fitted onto the battery case 13 with an insulation packing 12 interposed therebetween. Thus, a cylindrical battery was fabricated.

In a charge-discharge test, the battery was charged up to an upper voltage of 4.45 V at a constant charge current of 500 mA for 3 hours, and discharged to a lower voltage of 2.75 V at a constant discharge current of 100 mA in a constant temperature bath kept at 25° C. As a result, the discharge capacity was 873 mAh in the first cycle and 743 mAh in the 50th cycle.

The present invention provides a nonaqueous secondary battery exhibiting a high discharge capacity without a wide variation in the charge and discharge characteristics and with a high reproducibility. Further, the decrease in the discharge capacity of the nonaqueous secondary battery can be suppressed even if the charge and discharge cycle is repeated a greater number of times.

Even if the battery is charged up to a higher potential, the remarkable decrease in the discharge capacity during repeated charge and discharge cycles can be suppressed. Therefore, the present invention provides a nonaqueous secondary battery, particularly a lithium secondary battery, having superior cycle characteristics. The nonaqueous secondary battery of the present invention is highly resistant to over-charge. More specifically, it is not necessary to precisely control the charge voltage on the order of 0.01 V, but the charge voltage may be controlled on the order of 0.1 V when the battery is charged.

Particularly where the specific surface area of the active material is 0.2 m$^2$/g to 6 m$^2$/g, the active material and a nonaqueous secondary battery utilizing the same have a superior spontaneous discharge characteristic (storage characteristic).

Where the ratio $a_{Li}/a_{Ni}=(g_1+g_2)/(g_3+g_4)$ of the site occupation rate of lithium atoms to the site occupation rate of nickel atoms in the active material is 0.9 to 1.04, more preferably 1 to 1.04, the active material and a nonaqueous secondary battery utilizing the same have superior charge and discharge characteristics at a high temperature.

What is claimed is:

1. A nonaqueous secondary battery comprising a positive electrode, a negative electrode and a nonaqueous ion conductor, the negative electrode containing a lithium-containing substance or a lithium insertable and releasable substance as a negative electrode active material, the positive electrode containing a lithium nickelate compound as a positive electrode active material, wherein the lithium nickelate compound has a layered rocksalt crystalline structure belonging to Space Group R-3m and the ratio of a 3a- and 3b-site occupation rate of lithium atoms to a 3a- and 3b-site occupation rate of nickel atoms in the crystal lattice thereof is 0.85 to 1.15.

2. A nonaqueous secondary battery of claim 1, wherein the ratio of the 3a- and 3b-site occupation rate of lithium atoms to the 3a- and 3b-site occupation rate of nickel atoms is 0.85 to 1.04.

3. A nonaqueous secondary battery of claim 2, wherein the ratio of the 3a- and 3b-site occupation rate of lithium atoms to the 3a- and 3b-site occupation rate of nickel atoms is 0.9 to 1.04.

4. A nonaqueous secondary battery of claim 2, wherein the 3a- and 3b-site occupation rate of lithium atoms is 0.92 to 1.02.

5. A nonaqueous secondary battery of claim 2, wherein the 3a- and -3b-site occupation rate of nickel atoms is 0.98 to 1.08.

6. A nonaqueous secondary battery of claim 2, wherein the 3a-site occupation rate of nickel atoms is 0 to 0.08.

7. A nonaqueous secondary battery of claim 6, wherein the 3a-site occupation rate of nickel atoms is 0.01 to 0.08.

8. A nonaqueous secondary battery of claim 2, wherein the 3b-site occupation rate of lithium atoms is 0 to 0.07.

9. A nonaqueous secondary battery of claim 2, wherein the lithium nickelate compound has an a-axis lattice constant of 0.2870 nm to 0.2880 nm and a c-axis lattice constant of 1.4175 nm to 1.4210 nm.

10. A nonaqueous secondary battery of claim 1, wherein the ratio of the 3a- and 3b-site occupation rate of lithium atoms to the 3a- and 3b-site occupation rate of nickel atoms is 1.05 to 1.15.

11. A nonaqueous secondary battery of claim 10, wherein the 3a- and 3b-site occupation rate of lithium atoms is 1.02 to 1.07.

12. A nonaqueous secondary battery of claim 10, wherein the 3a- and 3b-site occupation rate of nickel atoms is 0.93 to 0.98.

13. A nonaqueous secondary battery of claim 10, which is adapted to be charged up to a voltage of 4.5 V to 5.0 V.

14. A nonaqueous secondary battery of claim 1, wherein the lithium nickelate compound has a specific surface area of 0.2 $m^2$/g to 10 $m^2$/g.

15. A nonaqueous secondary battery of claim 14, wherein the lithium nickelate compound has a specific surface area of 0.2 $m^2$/g to 6 $m^2$/g.

16. A nonaqueous secondary battery of claim 15, wherein the lithium nickelate compound has a specific surface area of 0.2 $m^2$/g to 5 $m^2$/g.

17. A nonaqueous secondary battery of claim 1, wherein the negative electrode active material is a carbon material.

18. A nonaqueous secondary battery of claim 17, wherein the negative electrode active material is a graphite material.

* * * * *